United States Patent
Velu et al.

(10) Patent No.: US 10,563,273 B1
(45) Date of Patent: Feb. 18, 2020

(54) METHOD FOR MAKING STRETCH LEATHER COMPOSITES AND ARTICLES CONTAINING THE SAME

(71) Applicant: Wolverine Outdoors, Inc., Rockford, MI (US)

(72) Inventors: Balaji Velu, Chennai (IN); Sylvain Yves Bussiere, Saikung North (HK)

(73) Assignee: Wolverine Outdoors, Inc., Rockford, MI (US)

( * ) Notice: Subject to any disclaimer, the term of this patent is extended or adjusted under 35 U.S.C. 154(b) by 0 days.

(21) Appl. No.: 16/220,198

(22) Filed: Dec. 14, 2018

Related U.S. Application Data

(60) Provisional application No. 62/754,777, filed on Nov. 2, 2018.

(51) Int. Cl.
| | | |
|---|---|---|
| *C14B 7/00* | (2006.01) | |
| *C14B 7/04* | (2006.01) | |
| *A43B 23/02* | (2006.01) | |
| *B29D 35/14* | (2010.01) | |
| *C14B 1/58* | (2006.01) | |

(52) U.S. Cl.
CPC .............. *C14B 7/04* (2013.01); *A43B 23/021* (2013.01); *A43B 23/0235* (2013.01); *B29D 35/146* (2013.01); *C14B 1/58* (2013.01); *C14B 2700/28* (2013.01)

(58) Field of Classification Search
CPC ... C14B 2700/28; C14B 1/44; C14B 2700/07; C14B 1/26; C14B 7/04; C14B 7/02; C14B 1/58; A43B 23/021; A43B 23/0234
See application file for complete search history.

(56) References Cited

U.S. PATENT DOCUMENTS

| | | | | |
|---|---|---|---|---|
| 3,956,560 A | * | 5/1976 | Smith, II | D04H 1/48 428/218 |
| 4,259,854 A | * | 4/1981 | Knyazeva | C14C 13/00 69/21 |

OTHER PUBLICATIONS

Photo of an Alexander Wang model in stretch kidskin (lamb).

* cited by examiner

*Primary Examiner* — Eisa B Elhilo
(74) *Attorney, Agent, or Firm* — Warner Norcross + Judd LLP

(57) ABSTRACT

A method of making stretch leather composites is provided. The method includes providing a semi-finished leather. The semi-finished leather is split to obtain a final split having a thickness of from 0.10 mm to about 1.25. The final split is dried to obtain a crust. The crust is laminated with a stretch fabric impregnated with a stiffener, e.g., starch, to prepare a laminate. The starch is removed from the stretch fabric after preparing the laminate, for example, by dissolving the starch in a liquid solution naturally present in another laminate processing step liquid. Laminating the crust can include the use of an adhesive. A method of manufacturing an article of footwear can include providing a stretch leather composite, cutting the stretch leather composite to conform to a predetermined shape, and manufacturing the footwear using the stretch leather composite.

20 Claims, No Drawings

METHOD FOR MAKING STRETCH LEATHER COMPOSITES AND ARTICLES CONTAINING THE SAME

BACKGROUND OF THE INVENTION

The present disclosure relates to stretch leather composites, and more particularly to methods of making stretch leather composites including an animal skin laminated with a stretch fabric.

Stretch leather composites including a soft leather laminated with glue to an elastic fabric are used in various consumer products, such as footwear, apparel, clothing and the like, as an alternative to other stretch materials having less desirable aesthetic characteristics. Existing methods for preparing stretch leather composites include laminating an elastic fabric to leather with glue. These methods include inefficiencies and processing challenges introduced at least by variations in degree of stretch of the elastic fabric during the lamination process and difficulties inherent in handling the stretch fabric during the lamination process. Moreover, stretch leather composites produced by pre-existing methods can lose their shape after being repeatedly stretched.

Accordingly, there remains room for improvement to produce stretch leather composites that address these disadvantages of pre-existing methods.

SUMMARY OF THE INVENTION

A method of making stretch leather composites is provided including: providing a semi-finished leather; splitting the semi-finished leather to obtain a final split having a thickness of from 0.10 mm to 1.25 mm; drying the final split to obtain a crust; and laminating over the crust a stretch fabric impregnated with a stiffener to prepare a laminate.

In one embodiment, the stiffener is removed from the stretch fabric after preparing the laminate. This removal can include dissolving the stiffener in a liquid solution. Optionally, the stiffener can be a polysaccharide, for example, starch.

In another embodiment, the stretch fabric can be laminated over the crust with an adhesive bonding a surface of the stretch fabric to the crust.

In still another embodiment, a stretch leather composite can be prepared according to the method described herein.

In yet another embodiment, a method of making a stretch leather composite is provided. The method can include: laminating a leather crust with a stretch fabric impregnated with a starch to prepare a laminate; removing the starch from the stretch fabric after preparing the laminate, wherein removing the starch includes dissolving the starch in a liquid solution.

In even another embodiment, a method of manufacturing an article of clothing is provided. The method can include providing a stretch leather composite prepared according to a method described above; cutting the stretch leather composite to conform to a predetermined shape; and using the stretch leather composite to manufacture an article of clothing.

In a further embodiment, a method of manufacturing a footwear upper component is provided. The method can include providing a stretch leather composite prepared according to a method described above; cutting the stretch leather composite to form an upper or an upper component; and optionally joining the upper or upper component with another footwear component, such as a sole, to manufacture the footwear.

The current embodiments provide an improved method of preparing stretch leather composites by using a stretch fabric temporarily impregnated with a stiffener to simplify and improve efficiency of the method over other methods known in the art. Moreover, the stretch leather composite produced by the method has an aesthetic value superior to alternative stretch fabric products and is suitable for use in the manufacture of a variety of articles including clothing. Additionally, the stretch leather composites are very supple and elastic in multiple directions, and yet are durable. For example, the stretch leather composite produced by the method can be stretched multiple times without loss of shape or significant loss of rebound characteristics of the composite.

These and other features and advantages of the present disclosure will become apparent from the following description of particular embodiments, when viewed in accordance with the appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

In a current embodiment, a stretch leather composite prepared by the method described herein comprises a leather, an adhesive and a stretch fabric. Before explaining the method and composite, the meanings of various terms used herein will be described to help understand the composite and the methods. For example, "leather" as used herein means a tanned hide or skin and various processed derivatives thereof where the tanned hide or skin is obtained from an animal such as a cow (including calves), sheep, pig, goat, kangaroo, deer, water buffalo, elk, lamb, and other animals, provided the tanned hide or skin is suitable for use in the stretch leather composite. "Grain side" means the side of the leather that was toward the outside of the animal, and "flesh side" means the side of the leather that was toward the inside of the animal. "Grain" means that surface of the leather that was disposed on the outside of the animal and exposed to the environment outside of the animal. The leather can be prepared from any of various portions of a tanned hide including belly, shoulder, bend, or back portions.

The leather included in the stretch leather composite can have a stretch optionally from about 10% to about 90%, from about 25% to about 90%, from about 30% to about 80%, from about 20% to about 70%, or from about 50% to about 80%. The stretch is measured in a direction of maximum stretch for the leather. For example, when the leather is belly leather, stretch is measured in a belly-belly direction. The stretch of the leather will vary depending upon the direction in which stretch is measured. For example, when the leather is belly leather, the leather will stretch maximally in the belly-belly direction and have less stretch in other directions, such as those directions diagonal to the belly-belly direction or those directions corresponding to a belly-back direction.

The leather can also have a softness which can be measured using a ST300 Leather Softness Tester, available BLC Leather Technology of Northhampton, England. The softness can be optionally from about 3.0 to about 5.0, from about 4.0-5.0, or from about 4.5-5.0. The leather optionally has a thickness of from about 0.10 mm to 1.25 mm, from about 0.25 to about 1.0 mm, from about 0.4 to about 0.75 mm, or from about 0.5 to about 0.6 mm.

The stretch fabric can be woven, knit, or nonwoven. The stretch fabric can have a stretchability that is higher, lower, or equivalent to that of the leather. The stretch of the stretch fabric can be from about 15% to about 100%, from about 25% to about 100%, from about 30% to about 80%, from about 20% to about 70%, or from about 50% to about 100%. The stretch fabric optionally includes cotton and polyester fabrics, optionally the stretch fabric includes from about 50% to about 98% cotton and from about 50% to about 2% polyester, from about 60% to about 98% cotton and from about 40% to about 2% polyester, or from about 85% to about 98% cotton and from about 2% to about 15% polyester. The stretch fabric can include alternative synthetic or natural fibers including bamboo, silk, wool, jute, RAYON, flax, hemp, ramie, sisal, abaca, coir, cashmere, mohair, camel hair, angora wool, alpaca wool, nylon, acrylic, polyvinyl chloride fibers (VINYON), fibers produced from polyvinyl alcohol (VINALON), ARAMID fibers, polybenzimidazole fiber, and various combinations thereof. The thickness of the stretch fabric is optionally from about 0.25 mm to about 2 mm, from about 0.5 mm to about 1.6 mm, from about 1 mm to about 1.5 mm, or from about 1 mm to about 1.6 mm. The stretch fabric can be a 2-way stretch fabric (stretching in one direction) or a 4-way stretch fabric (stretching crosswise and lengthwise).

The stretch fabric comprises an elastomeric fiber. "Elastomeric fiber" means a staple fiber or continuous filament having a break elongation in excess of 100% and that when stretched and released, retracts quickly and forcibly to substantially its original length. Examples of elastomeric fibers include rubber (natural or synthetic) fibers, polyetherpolyurea copolymer fibers (e.g., SPANDEX, LYCRA, or elastane), polyetherester fibers, polyethylene fibers, crosslinked polyacrylate fibers, ANIDEX, and nylon-SPANDEX biconstituent fiber. The elastomeric fibers can be covered or entangled with other non-elastomeric fibers or can be bare (uncovered). The stretch fabric can contain various combinations of elastomeric fibers. SPANDEX is typically manufactured filaments or fiber in which the fiber-forming substance is a long-chain synthetic elastomer comprised of at least 85% by weight of a segmented polyurethane.

The adhesive can be disposed between and in physical contact with both the leather and the stretch fabric to affix the leather and stretch fabric to one another in the stretch leather composite. The adhesive can be disposed upon either the flesh side or the grain side of the leather so as to adhere the stretch fabric to either the flesh side or the grain side of the leather, respectively.

In various embodiments, the stretch fabric is sandwiched between two leather layers so that the adhesive is disposed in physical contact with both surfaces of the stretch fabric and a single surface of each of the two leather layers so as to adhere the stretch fabric and the two leather layers together to form the stretch leather composite. Optionally, the adhesive can be impregnated or embedded in and between and around individual strands of material in the stretch fabric.

The adhesive can be sufficiently elastic to not inhibit the stretch of the stretch leather composite. Examples of suitable adhesives include hot melt and pressure-sensitive adhesives, solvent-based adhesives, latex adhesives, polyolefins, polyamides, polyesters, polyurethanes and polyurethane hot-melt films, styrene block copolymers, polycarbonates, fluoropolymers, silicone rubbers, thermoplastic elastomers, polypyrrole, and various mixtures or co-polymers thereof.

The stretch leather composite optionally includes a total thickness of from around 0.5 to around 1.5 mm, from around 0.75 to around 1.25 mm, or from around 0.75 to about 1.1 mm. Optionally, the stretch leather composite includes a porosity allowing moisture and gases to freely flow therethrough. The stretch leather composite optionally has a tensile strength from about 50 kg/cm$^2$ to 150 kg/cm$^2$, from about 75 kg/cm$^2$ to 125 kg/cm$^2$, from about 90 kg/cm$^2$ to about 110 kg/cm$^2$, or about 100 kg/cm$^2$. The stretch leather composite is optionally from about 1 ft$^2$ to about 10 ft$^2$, from about 2 ft$^2$ to about 8 ft$^2$, or from about 3 ft$^2$ to about 7 ft$^2$.

The stretch leather composite optionally has a stretch from about 10% to about 90%, from about 25% to about 90%, from about 30% to about 80%, from about 20% to about 70%, or from about 50% to about 80%. The stretch leather composite can be cycled between a stretched state and an unstretched state at least 100, 200, or 500 times without any structural damage resulting in alterations in the shape (e.g., creases, wrinkles, bulges, dents, changes in length, width, or surface area) of the stretch leather composite in the unstretched state. The stretched state can correspond to a stretch of optionally from about 10% to about 90%, from about 25% to about 90%, from about 30% to about 80%, from about 20% to about 70%, or from about 50% to about 80%. The stretch leather composite can have a shelf-life of at least one year at 30° C. and under dry conditions. "Unstretched state" means that state in which substantially no external forces are applied to the stretch leather composite.

The stretch leather composite can be used to make various manufactured articles such as clothing including footwear (e.g., slip-on shoes, gusset shoes), garments, coats, belts, hats, gloves including athletic gloves, jackets, and various components thereof. The stretch leather composites, for example, maybe used in the manufacture of tips, foxings, or gores for shoes (e.g., sandals or boots). Optionally, when used in footwear, the stretch leather composites can be used to manufacture an upper or upper components, such as vamps, quarter panels, heel panels, tongues and the like, or entire uppers constructed as a single piece unit. These manufactured uppers and upper components can lasted on a last and joined with a Strobel board at a peripheral allowance. An outsole can then be joined with the upper having the stretch leather composite to form a completed footwear.

Further optionally, the stretch leather composites can be used to make furniture including residential, commercial, and automotive seating. The stretch leather composite can be used as an alternative to SPANDEX or LYCRA in various applications, or as an alternative to regular non-stretch leather in various applications.

As mentioned above, the method can be used to manufacture an article of clothing. Such a method can include cutting the stretch leather composite to conform to a predetermined shape appropriate for use in the manufacture of the article of clothing and then using the stretch leather composite after being cut-to-shape in the manufacture of the article of clothing. Optionally, the stretch leather composite may be disposed within the article of clothing such that a direction in which the article of clothing is exposed to maximal stretch during use corresponds to a direction of maximum stretch for the stretch leather composite. For example, when the stretch leather composite is used in the manufacture of a top surface of a shoe it can be advantageous to dispose the stretch leather composite such that the direction of maximum stretch laterally traverses the shoe; alternatively, it may be advantageous to dispose the stretch leather composite such that the direction of maximum stretch extends along the length of the shoe. The stretch leather composite is disposed within an article of clothing such that the stretch leather imparts stretch characteristics to the article of clothing in a manner appropriate to an end-use of the article of clothing. Optionally, the stretch leather composite can be used to manufacture a nubuck leather product, a suede leather product, a polished leather product, or other leather products depending on the application.

The method of making stretch leather composites can be implemented with a semi-finished leather. Semi-finished leather can be prepared using any of a variety of tanned leathers including vegetable-tanned leather, chrome-tanned leather (also known as "wet blue" leather), aldehyde-tanned leather, brain-tanned leather, and alum leather. In various embodiments, the semi-finished leather is prepared from pig belly wet blue leather. Preparing the semi-finished leather includes splitting the pig belly wet blue leather to obtain a grain-side split having a thickness optionally from about 0.5 mm to about 3 mm, from about 0.8 mm to about 2.5 mm, or from about 1 mm to about 2 mm. The method can include splitting and skiving the grain-side split and buffing a grain-side of the grain-side split. The buffing of the grain-side of the grain-side split yields a nubuck leather. The buffing step can be omitted if the stretch leather composite to be made by the method includes a polished leather surface.

Preparing the semi-finished leather can include re-tanning the grain-side split. A further action in the preparation of the semi-finished leather can be sammying the grain-side split to a moisture content of optionally from about 30% by weight to about 75% by weight, from about 40% by weight to about 60% by weight, from about 45% by weight to about 55% by weight, or about 50% by weight. Preparation of the semi-finished leather can also include milling the grain-side split for about 1 hour to about 6 hours, from about 2 hours to about 5 hours, or from about 3 hours to about 4 hours.

The method of making stretch leather composites can include providing semi-finished leather prepared as described above and subjecting it to one or more of the following actions. The semi-finished leather can be split, which means cutting or skiving leather into two or more layers, to obtain a final split having a thickness optionally of from about 0.25 mm to about 1.25 mm, from about 0.4 mm to about 1 mm, from about 0.25 to about 0.9 mm, or from about 0.5 to about 0.6 mm. Optionally the final split corresponds to a flesh-side split created by splitting (i.e., the final split is a split layer obtained by splitting the semi-finished leather and the final split is not a grain layer) or the final split is a grain-side split created by splitting. The final split can be dried, using a vacuum, rollers, or other equipment, to a final moisture content from about 10% to about 50% by weight, from about 10% to about 20% by weight, or from about 12% to about 14% by weight to obtain a crust. The crust can be considered leather, which has been tanned, but not finished. Tanned means that a perishable raw hide has been converted into leather. Optionally, drying the final split can include hang-drying the final split for from about 6 hours to about 24 hours, from about 8 hours to about 16 hours, or from about 12 hours to about 14 hours. The crust can be staked or dry drummed under controlled humidity conditions to increase the softness of the crust such that it has the softness values mentioned above.

As mentioned above, the crust can be laminated with a stretch fabric impregnated with or otherwise embedded with a stiffener to prepare the laminate, optionally before any dying of the material. The stiffener can be a polysaccharide, such as starch, or other compounds as described below. Where the stiffener is a starch, it can be a modified starch or an unmodified starch, such as corn starch, potato starch, dextrin, acid-treated starch, bleached starch, oxidized starch, monostarch phosphate, distarch phosphate, starch acetate, acetylated distarch adipate, hydroxypropyl starch, hydroxypropyl distarch phosphate, hydroxypropyl distarch glycerol, starch sodium octenyl succinate, and acetylated oxidized starch. The stretch fabric can be impregnated with the starch via various techniques.

The stretch fabric impregnated with a stiffener is rendered stiff and rigid by the stiffener. The elastomeric fiber of the stretch fabric impregnated with the stiffener, such as starch, may be in the stretched state or the upstretched state. Impregnating the stretch fabric with a starch has the advantage of holding the stretch fabric in either the stretched state or the unstretched state so that the fabric is uniformly and homogenously stretched or unstretched during lamination. Use of a stretch fabric stiffened by impregnation with starch can increase processing efficiencies relative to alternative methods for preparing stretch leather composites because the stretch fabric impregnated with a starch is easier to work with than non-starch impregnated stretch fabrics. In various embodiments, the stretch fabric impregnated with a starch may be substituted with a stretch fabric rendered stiff or rigid using alternative stiffeners that can be removed by dissolution of those stiffeners in a liquid or by using a process, such as dying, tanning, or liquoring, used in the processing of leather.

Optional other stiffeners for stiffening the stretch fabric can include water-soluble glues (e.g., poly(vinyl acetate), poly(ethenyl ethanoate), wood glue, white glue, collagen, and carpenter's glue) or flours (e.g., wheat flour, rice flour, hemp flour, nut flours, buckwheat flour, tapioca flour, or sorghum flour).

The crust can be laminated with a stretch fabric impregnated with the stiffener to prepare a laminate. This method can include one or more of the following steps. An adhesive can be applied to a first surface of the stretch fabric impregnated with the stiffener, for example, starch to prepare an adhesive surface. The first surface can be an upper, lower, upward facing or downward facing surface of a sheet, roll, strip or other piece of the stretch fabric as described above. The adhesive can be applied to the first surface, for example, as a sheet or film, as a spray, by spreading, painting, coating, rolling or by various other methods depending on the intended application. The adhesive can be disposed upon the first surface in various continuous or discontinuous patterns and the adhesive may or may not cover the entirety of the first surface in an un-interrupted manner. Optionally, adhesive can be applied only to a surface of the final crust or to both the surface of the final crust and the first surface of the stretch fabric impregnated with starch. Where the adhesive is applied to the stretch fabric, that surface can be an adhesive surface. Of course, as explained below, if the adhesive is applied instead or in addition to a first surface of the crust, that surface can be considered an adhesive surface.

The adhesive surface of the stretch fabric impregnated with starch can be placed so that the adhesive surface is in direct contact with and substantially covers a second surface, which can be optionally a flesh-side surface opposite a buffed grain surface (e.g., to prepare a stretchable nubuck leather stretch leather composite or a stretchable polished leather stretch leather composite), of the final crust to prepare a pre-laminate). Optionally, the adhesive can be applied only to the second surface to prepare the adhesive surface, or the adhesive may be applied to both the first surface and the second surface to prepare two adhesive surfaces. Further optionally, the second surface is a grain surface or a grain-side surface of the crust (e.g., to prepare a suede leather stretchable stretch leather composite). Yet further optionally, the adhesive surface contacts substantially all of the second surface, or the adhesive surface contacts only a select portion of the second surface. The contact of the adhesive surface and the second surface yields a layered material including the stretch fabric and crust, which can be considered a pre-laminate.

The pre-laminate can be processed to prepare the laminate in a variety of manners with a variety of equipment. For example, the pre-laminate can be fed through an ironing machine. Examples of ironing machines include a flat press, a roller press, a roller ironing machine, and various other ironing machines or other equipment that can exert a mechanical force to compress the two layers together. Where the ironing machine is a roller ironing machine, the operating temperature can be optionally from around 100° C. to around 150° C., from around 120° C. to around 140° C., or around 130° C., the operating speed can be from about 2 m/min to about 8 m/min, from about 3 m/min to about 7 m/min, or from about 5 m/min to about 6 m/min, and the operating pressure can be from about 20 bar to about 60 bar, from about 30 bar to about 50 bar, or from about 35 bar to about 45 bar. Cooling the laminate to room temperature and aging the laminate for from about 6 hours to about 24 hours, from about 9 hours to about 16 hours, or from about 10 hours to about 12 hours. After the pressing or mechanical force is applied to the stretch fabric and crust, the laminate is produced.

The method as mentioned further includes removing the stiffener from the laminate, and in particular from the stretch fabric, as most of it remains in the stretch fabric, although some may have become embedded in or seeped into the crust during the pressing. Removing the stiffener from the laminate can include dissolving the stiffener in a liquid solution and allowing the solution to seep out from or drain away from the laminate. Examples of liquid solutions include solutions used in the processing of the laminate such as a re-tanning and fat-liquoring solution, and a dying solution, many of which include water, oils and other compounds. Therefore, where the stiffener is a polysaccharide such as starch it can be removed from the laminate as a natural consequence of down-stream processing of the laminate to prepare a stretch leather composite without the need for any dedicated rinsing step; however, a dedicated rinsing step can optionally be included in the method.

Depending on the application and desired finished product, the method can include several processing steps. For example, the laminate can undergo re-tanning and fat-liquoring. The re-tanned laminate can undergo sammying to a moisture content of optionally from about 30% by weight to about 75% by weight, from about 40% by weight to about 60% by weight, from about 45% by weight to about 55% by weight, or about 50% by weight.

Optionally, the laminate can be milled optionally for about 1 hour to about 6 hours, from about 2 hours to about 5 hours, or from about 3 hours to about 4 hours. The laminate also can be dyed after being formed, optionally using anionic dyes. The laminate can be dyed to a moisture content of optionally from about 10% to about 50% by weight, from about 10% to about 20% by weight, or from about 14% to about 16% by weight. Optionally, drying the laminate includes hang-drying the laminate for from about 6 hours to about 24 hours, from about 8 hours to about 16 hours, or from about 12 hours to about 14 hours.

In some applications, the method can include additional actions including the following: shaving, ironing, plating, embossing, polishing, and chemical finishing of the leather. The method may include treatments such as applying water repellent or scuff-resistant finishes to the stretch leather composite, or various other treatments known in the art to be advantageously used in the preparation of a leather product.

Various chemicals can be used in the re-tanning process including tanning agents (e.g., NOVALTAN AL, SYNTEX ATF (aluminum triformate)), tanning auxiliaries (TAMMOL X NL), BLANCOROL CGA, and dispersing agents (BUSPERSE 7764, BAYMOL AN2C), formic acid, sodium formate, sodium metabisulphite, sodium bicarbonate, and various combinations thereof.

The solution used for fat-liquoring may include any of various fat liquors known in the art including BAYKANOL TF-2N, COROLON OT, BUTAN OIL 7907, PROVOL CAD, SYNTHOL MC, and DUVOIL HL, mineral oil, castor oil, neatsfoot oil, cod oil, coconut oil, or various combinations thereof.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of making stretch leather composites for footwear, the method comprising:
   providing semi-finished leather;
   splitting the semi-finished leather to obtain a final split having a thickness of from about 0.10 mm to about 1.25 mm;
   drying the final split to obtain a crust;
   laminating the crust with a stretch fabric impregnated with a stiffener to prepare a laminate; and
   removing the stiffener from the stretch fabric after preparing the laminate;
   wherein removing the stiffener includes dissolving the stiffener in a liquid solution,
   wherein the laminating includes the use of an adhesive.

2. The method of claim 1,
   wherein the semi-finished leather comprises pig belly leather.

3. The method of claim 2,
   wherein the semi-finished leather comprises pig wet blue leather.

4. The method of claim 3, comprising:
   obtaining pig wet blue leather;
   splitting the pig wet blue leather to obtain a grain-side split having a thickness from about 1 mm to about 2 mm;
   skiving the grain-side split; and
   buffing the grain-side of the grain-side split.

5. The method of claim 4, comprising:
   retanning the grain-side split into a natural crust;
   sammying the grain-side split to about 50% by weight moisture content; and
   milling the grain-side split.

6. The method of claim 1, comprising:
   drying the final split to a moisture content of from about 12% to about 14% by weight; and
   staking the final split.

7. The method of claim 1, comprising:
   applying a polyurethane hot-melt film to a first surface of the stretch fabric impregnated with stiffener to create an adhesive surface;
   disposing the adhesive surface of the stretch fabric impregnated with stiffener so that the adhesive surface is in direct contact with and covers a second surface of the final crust to prepare a pre-laminate;
   feeding the pre-laminate through an ironing machine to prepare the laminate;
   cooling the laminate to room temperature; and
   aging the laminate.

8. The method of claim 7,
   wherein the second surface corresponds to a flesh-side surface of the final crust,
   wherein the final crust includes a buffed grain surface opposite the flesh-side surface.

9. The method of claim 1,
   wherein the final split is a split layer obtained by splitting the semi-finished leather and the final split is not a grain layer.

10. The method of claim 1, comprising:
    re-tanning and fat-liquoring the laminate;
    sammying the laminate;
    milling the laminate;
    dying the laminate; and
    drying the laminate to a moisture content of about 14% to about 16% by weight,
    wherein the stiffener is dissolved in a liquid solution present during at least one of the re-tanning and fat-liquoring step and the dying step,
    wherein the liquid solution is present naturally in and utilized to process the laminate in the at least one of the re-tanning and fat-liquoring step and the dying step.

11. The method of claim 1,
    wherein the stiffener is a starch,
    wherein the stretch fabric impregnated with starch comprises an elastomeric fiber in at least one of a stretched state and an unstretched state.

12. The method of claim 1, comprising:
    at least one of re-tanning, fat-liquoring and dying the laminate; and
    dissolving the stiffener in a liquid solution present during the at least one of the re-tanning, fat-liquoring and dying the laminate, such that no other solvent need be added to carry out the dissolving the stiffener.

13. The method of claim 11,
    wherein the stretch fabric impregnated with starch comprises a stretch fabric comprising about 96% by weight cotton and about 4% by weight polyester and includes a thickness of about 0.25 mm to about 1 mm.

14. A stretch leather composite prepared by the method of claim 1.

15. The stretch leather composite of claim 14,
    wherein the stretch leather composite has a tensile strength of about 100 kg/cm2 in a first direction.

16. The stretch leather composite of claim 14,
wherein the stretch leather composite is about 3 ft2 to about 4.5 ft2 in dimension.

17. The stretch leather composite of claim 14,
wherein the stretch leather composite can stretch up to 80% by length.

18. The stretch leather composite of claim 14,
wherein the stretch leather composite can be cycled between a maximally stretched state and an unstretched state at least 200 times without structural damage altering the shape of the stretch leather composite in the unstretched state.

19. A method of making stretch leather composites for footwear, the method comprising:
laminating a leather crust with a stretch fabric impregnated with a starch to prepare a laminate; and
removing the starch from the stretch fabric after preparing the laminate;
wherein removing the starch includes dissolving the starch in a liquid solution.

20. The method of claim 19, comprising:
at least one of re-tanning, fat-liquoring and dying the laminate; and
dissolving the starch in the liquid solution which is present during the at least one of the re-tanning, fat-liquoring and dying the laminate, such that no other additional solvent need be added to carry out the dissolving of the starch.

* * * * *